(12) United States Patent
Orbon et al.

(10) Patent No.: US 12,503,247 B2
(45) Date of Patent: Dec. 23, 2025

(54) PROPULSION SYSTEM FOR ELECTRIC AIRCRAFT

(71) Applicant: Archer Aviation Inc., San Jose, CA (US)

(72) Inventors: James Orbon, Newport Beach, CA (US); Alan Buehne, Mission Viejo, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/273,382

(22) PCT Filed: Jan. 21, 2022

(86) PCT No.: PCT/US2022/013272
§ 371 (c)(1),
(2) Date: Jul. 20, 2023

(87) PCT Pub. No.: WO2022/159674
PCT Pub. Date: Jul. 28, 2022

(65) Prior Publication Data
US 2024/0092493 A1    Mar. 21, 2024

Related U.S. Application Data

(60) Provisional application No. 63/140,515, filed on Jan. 22, 2021.

(51) Int. Cl.
*B64D 35/021* (2024.01)
*B64C 27/14* (2006.01)
(Continued)

(52) U.S. Cl.
CPC ............ *B64D 35/021* (2024.01); *B64C 27/14* (2013.01); *B64D 27/34* (2024.01); *B64D 35/02* (2013.01);
(Continued)

(58) Field of Classification Search
CPC ........................................... B64D 35/021–025
See application file for complete search history.

(56) References Cited

U.S. PATENT DOCUMENTS 10,604,241 B1 * 3/2020 Dong .................... B64D 27/24
2011/0274548 A1   11/2011 Stamps et al.
(Continued)

FOREIGN PATENT DOCUMENTS

KR    20170083525    7/2017

OTHER PUBLICATIONS

Extended European Search Report for European Patent Application No. 22743228.3, dated Oct. 23, 2024, 10 pages.
(Continued)

*Primary Examiner* — Nicholas McFall
(74) *Attorney, Agent, or Firm* — Finnegan, Henderson, Farabow, Garrett & Dunner, LLP

(57) ABSTRACT

In a first aspect, described herein is a direct drive electric aircraft propulsion wherein the propulsion rotor torque is decoupled from the primary proprotor mast moment forces. A hub shaft locates the propulsion proprotor assembly in space relative to the aircraft nacelle, while a motor torque coupler transfers torque from the electric motor to the propulsion rotor while resolving a negligible amount of mast moment through the electric motor.

18 Claims, 14 Drawing Sheets

(51) Int. Cl.
  *B64D 27/34*  (2024.01)
  *B64D 35/02*  (2024.01)
  *H02K 7/00*   (2006.01)
  *H02K 7/08*   (2006.01)
  *B64C 29/00*  (2006.01)

(52) U.S. Cl.
  CPC ............ *H02K 7/003* (2013.01); *H02K 7/006* (2013.01); *H02K 7/08* (2013.01); *B64C 29/0033* (2013.01)

(56) References Cited

U.S. PATENT DOCUMENTS

| | | | |
|---|---|---|---|
| 2018/0051701 A1* | 2/2018 | Kupiszewski | ....... H02K 5/1732 |
| 2018/0339773 A1 | 11/2018 | McCullough | |
| 2019/0077502 A1 | 3/2019 | Owens | |
| 2020/0079494 A1 | 3/2020 | Ghapgharan | |

OTHER PUBLICATIONS

International Search Report for International Patent Application No. PCT/US2022/013272, dated May 6, 2022, 3 pages.
Written Opinion of the International Searching Authority for International Patent Application No. PCT/US2022/013272, dated May 6, 2022, 5 pages.
Arthur Dubois et al., Design of an Electric Propulsion System for SCEPTOR, American Institute of Aeronautics and Astronautics, dated Jun. 13, 2016, 30 pages.

* cited by examiner

PROPULSION SYSTEM FOR ELECTRIC AIRCRAFT

PRIORITY CLAIM

This application claims priority to U.S. provisional application having Ser. No. 63/140,515 (filed Jan. 22, 2021). These and all other extrinsic material discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is electric aircraft propulsion.

BACKGROUND

Electric vertical takeoff and landing aircraft use thrust from an electric propulsion unit to lift the aircraft as well as to propel the aircraft forward. Use of electric motors with aircraft propulsion units is relatively new and requires special considerations.

SUMMARY

Rigid aircraft proprotors can develop significant mast moment force—a torque that imparts bending forces upon the rotor shaft. The mast moment can be contributed to by non-uniform inflow, cyclic blade pitch being commanded of the rotor, or some other source. Large mast moments generated by aircraft propulsion systems complicate the use of direct drive powertrains. Electric motors require an air gap between the motor rotor and the motor stator. Large mast moment input to a direct drive output shaft could eliminate the airgap on one side and cause catastrophic damage to the drive motor.

Furthermore, minimizing motor air gap (the distance between an electric motor rotor and stator) in an electric aircraft is important for optimizing motor performance. Electric motors with a smaller air gap tend to be more efficient. On the other hand, mechanical interference between the motor rotor and motor stator at any point during motor operation can have catastrophic effects. Thus, maintaining a small but stable air gap can enable desirable energy density properties as well as reliability characteristics.

In one propulsion system embodying the principle of the invention, the motor torque and the mast moment forces are each resolved primarily through separate load paths. This can enable implementation of a small but stable motor air gap. Mast moment—as well as other forces and vibrations associated with a proprotor system—may be resolved primarily through a first load path to the main aircraft structure. The propulsion drive motor torque is transferred to the proprotor primarily by way of a second load path.

In a first aspect, the subject matter herein describes an aircraft propulsion system that addresses the problem of decoupling aspects of an electric powertrain—for example the electric motor—from large mast moments induced by an aircraft proprotor.

In another aspect, described herein is a system for integrating a direct drive electric motor into an aircraft propulsion system.

In some aspects, the subject matter herein describes principles that may be applicable to rotors, proprotors, or propellers. For convenience, the term proprotor is used herein. Unless indicated otherwise, the term should be understood to encompass propellers, proprotors, rotors, fans, ducted fans, propulsors or other similar propulsion systems.

Various objects, features, aspects and advantages of the inventive subject matter will become more apparent from the following detailed description of preferred embodiments, along with the accompanying drawing figures in which like numerals represent like components.

DETAILED DESCRIPTION

Rigid aircraft proprotors can develop significant mast moment forces—a torque that imparts a bending force upon the proprotor shaft. The mast moment can be contributed to by non-uniform inflow, cyclic blade pitch being commanded of the proprotor, or some other source. Mast moment forces complicate the use of direct drive powertrains in proprotor systems. Electric motors require an air gap between the motor rotor and the motor stator. Large mast moment input directly to a direct drive output shaft could eliminate the air gap at one point and cause catastrophic damage to the drive motor.

Furthermore, minimizing motor air gap (the distance between an electric motor rotor and stator) in an electric aircraft is important for optimizing motor performance. Electric motors with a smaller air gap tend to be more efficient. On the other hand, mechanical interference between the motor rotor and motor stator at any point during motor operation can be catastrophic. Thus, maintaining a small but stable air gap can enable desirable energy density properties as well as reliability characteristics.

In one embodiment of a propulsion system embodying the principle of the invention, the motor torque and the mast moment forces are each resolved primarily through separate load paths. This can enable implementation of a small but stable motor air gap. Mast moment—as well as other similar forces and vibrations associated with a proprotor system—may be resolved primarily through a first load path to the main aircraft structure. The thrust force is also reacted primarily through the first load path. The motor drive torque is transferred to the rotor primarily by way of a second load path.

In a first aspect, the subject matter herein describes an aircraft propulsion system that addresses the problem of decoupling a direct drive electric motor from large mast moment forces. Embodiments herein address rigidity, weight, and service life concerns for a direct drive electric aircraft rotor system.

The subject matter herein describes principles that may be applicable to rotors, proprotors, or propellers. For convenience, the term proprotor is used herein. Unless indicated otherwise, the term should be understood to encompass propellers, proprotors, rotors, fans, ducted fans, propulsors or other similar propulsion systems.

Figure 2:
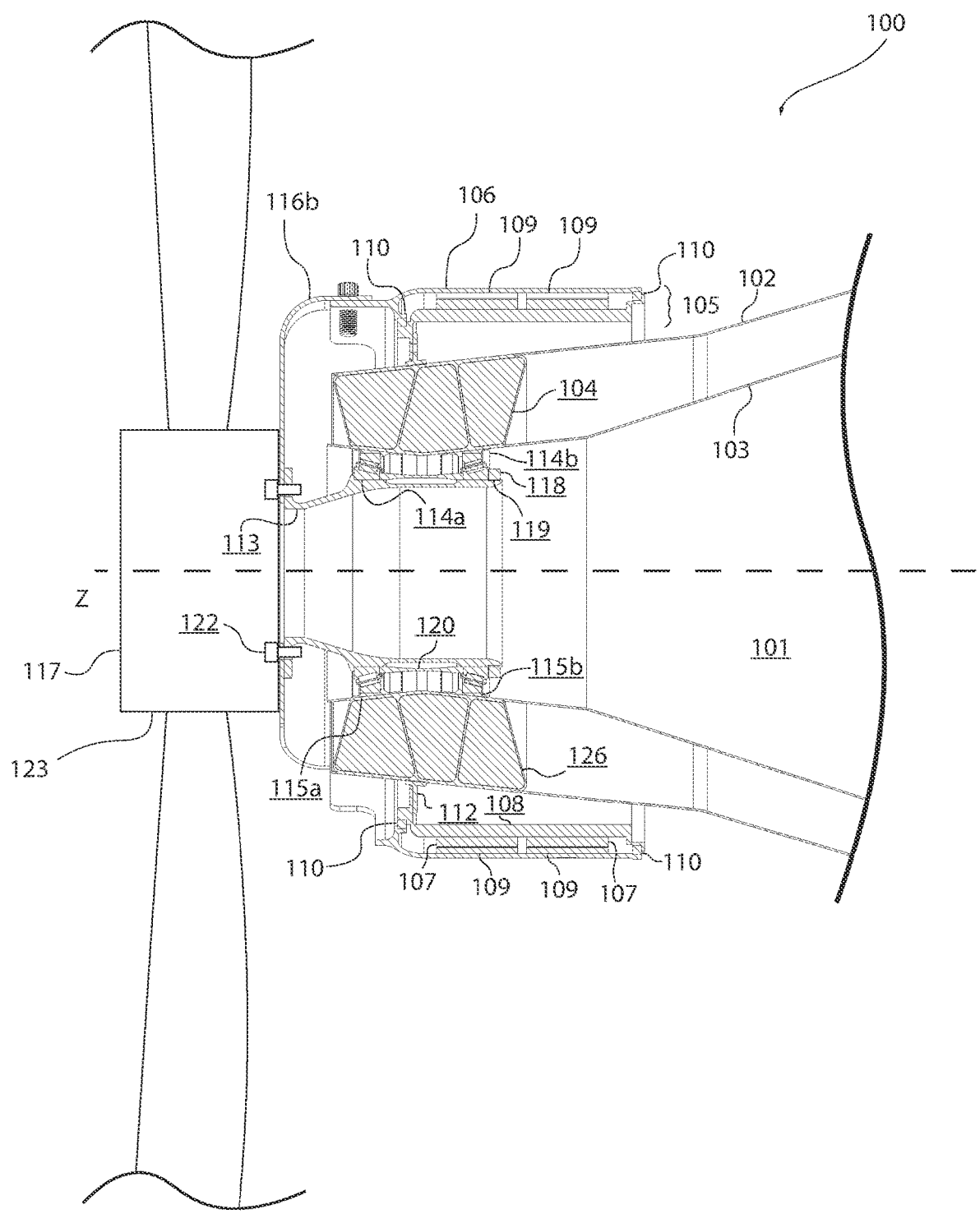
FIG. 2 illustrates a side cutaway view of an alternative embodiment of a direct drive aircraft propulsion system, in which the motor torque coupler comprises an a flexible linkage.

Illustrated in FIG. 2 is axis A. Axis A, in FIG. 2 is collinear with the axis of rotation of a proprotor. An X-Y plane is perpendicular to the A-axis. A mast moment force may comprise a force vector component perpendicular to the Z-axis. A propulsion force will comprise a force component parallel to vector A. Propulsion forces and mast moment forces can primarily be resolved through the first load path.

In some embodiments described herein the hub diameter is small relative to the nacelle structure and/or the corresponding direct drive motor. Direct drive electric motor embodiments described herein can enable relatively small pitch diameter bearings to be used to react the main load and moment forces of the proprotor. Using bearings that are relatively small compared to the nacelle and/or corresponding direct drive motor may address several concerns including: (1) minimizing bearing weight; (2) minimizing bearing deflection—such as truncation whereby the contact patch between roller and the race moves off the bearing race, a concern of deflection induced contact angle that alters the bearing contact patch, which exacerbates bearing wear/spalling/galling effects as well as wears the edge of the roller; (3) thermal management concerns due to excessive pitch line velocity and, (4) the associated lubrication concerns of a relatively larger bearing diameter (e.g. grease packed vs. oil lubricated). An aircraft propulsion system comprising a large diameter nacelle interface may address the concern of achieving desired nacelle structure characteristics while minimizing weight. In some applications, a composite nacelle structure may require more plies to attain the same strength as a comparable, but larger diameter nacelle structure—thus resulting in a heavier nacelle.

Some embodiments herein comprise a system for integrating a direct drive electric motor into an aircraft propulsion system wherein the motor topology addresses a desire to operate at a relatively low rpm, for example between 100 and 1,000 rpm.

Some embodiments herein describe a propulsion system especially well-suited for: use with proprotors equipped with cyclic control authority that may develop relatively large hub moments; Aircraft equipped with rigid proprotors; aircraft that operate in a vertical flight mode, such as tiltrotor aircraft; and aircraft with large proprotors—for example, larger than 2 meters in diameter.

Some embodiments herein describe a propulsion system especially well-suited for large diameter nacelles and large diameter electric motors. Large diameter nacelles—for example, nacelles comprising composite—may undergo significant flex during aircraft operation. In one aspect described herein is a propulsion system that addresses the desire of using large-scale composite support structures to house large diameter electric motors.

Figure 1:
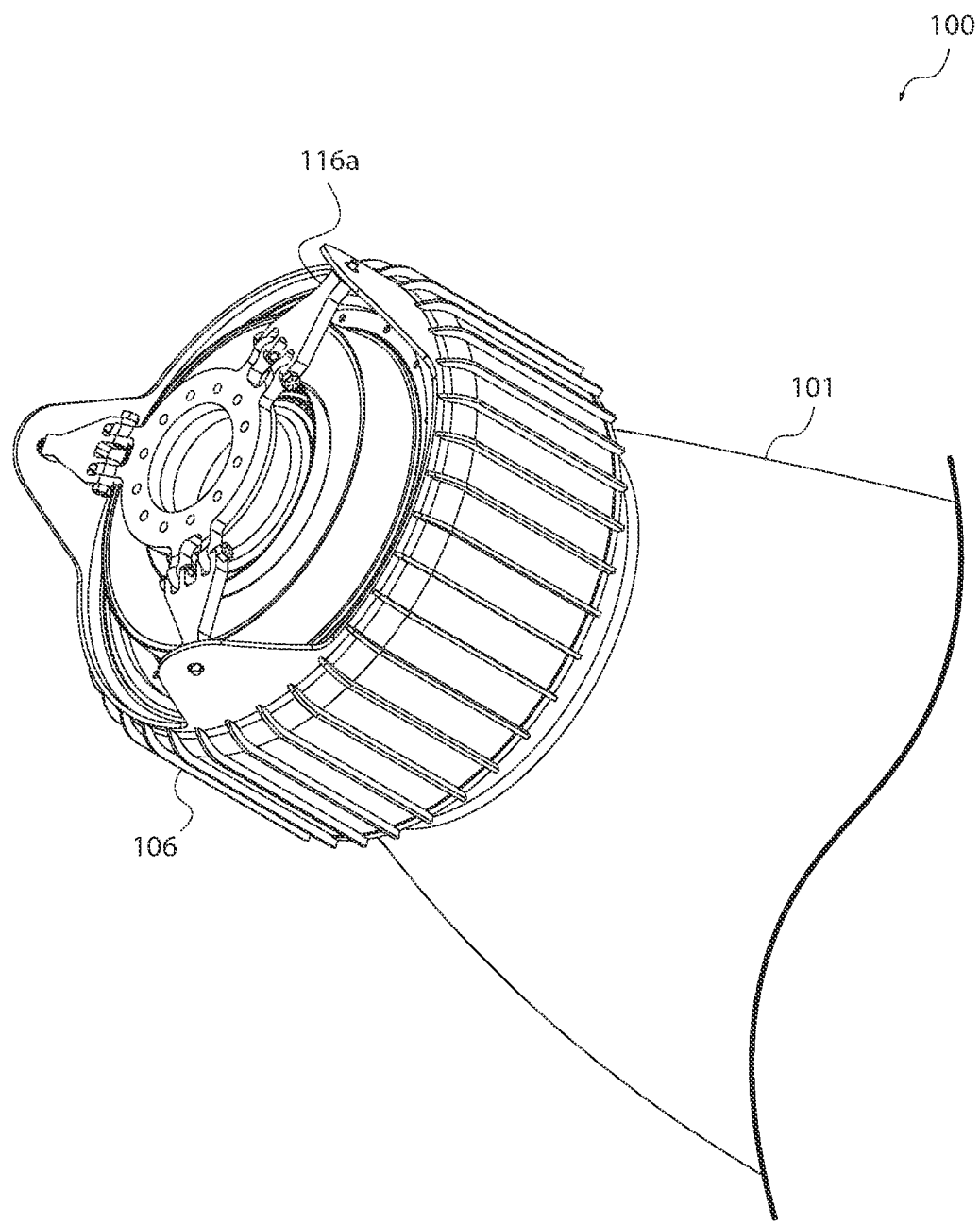
FIG. 1 illustrates an embodiment of a direct drive aircraft propulsion system, in which the motor torque coupler comprises an articulated linkage.

FIG. 1 illustrates aspects of an embodiment of an aircraft propulsion system 100 in which the motor torque coupler 116A comprises an articulated linkage.

Illustrated in the embodiment of FIG. 2 is an embodiment of a direct drive electric propulsion system for an aircraft. The system comprises outer nacelle structural member 102, inner nacelle structural member 103, and nacelle webbing 104. Outer nacelle structural member 102 may be co-cured with an outer structural shell of nacelle 101. In the embodiment of FIG. 2, nacelle 101 comprises composite material. However, other embodiments may use any suitable material in addition to or in place of composite.

Motor assembly 105 comprises motor rotor housing 106. Motor windings 107 are connected to motor stator insert 108. Motor magnets 109 are connected to the motor rotor housing 106. Motor assembly 105 also comprises motor bearings 110. Motor rotor stator insert 108 is connected to motor mounting bracket 112.

Figure 4:
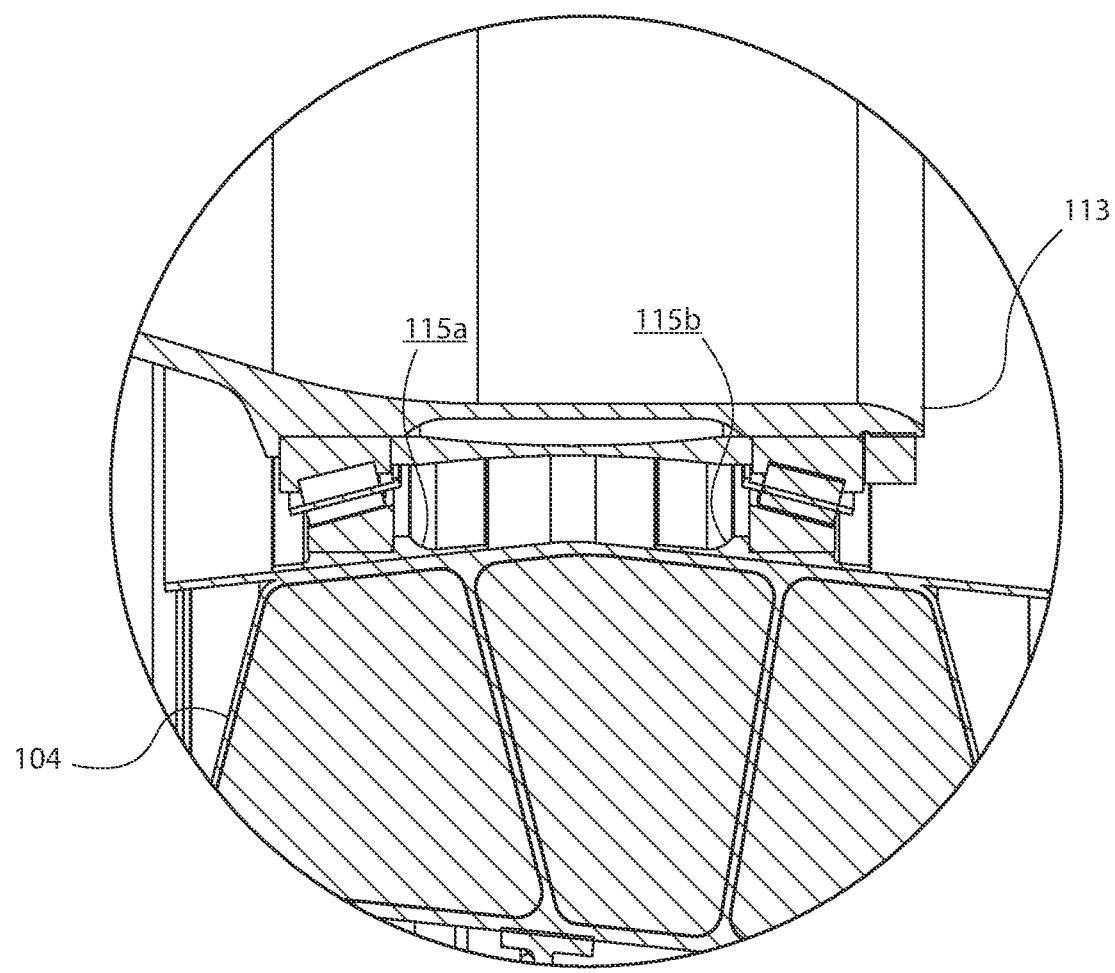
FIG. 4 illustrates a detail cutaway view of aspects an embodiment of an aircraft propulsion including hub shaft bearing inserts.

Aircraft propulsion system 100 comprises a hub shaft 113, hub shaft bearings 114a and 114b, and hub shaft bearing inserts 115a and 115b. The hub shaft inserts 115 are shown in FIG. 4. Hub shaft 113, hub shaft bearings 114a and 114b and other associated hardware is configured to react mast moment as well as forces in the z-axis—for example, the force of the rotor lifting the aircraft. The forces reacted by hub shaft bearings 114 are reacted by inner nacelle structural member 103.

Aircraft propulsion system 100 comprises motor torque coupler 116B. In the embodiment of FIG. 2, motor torque coupler 116B comprises a flexure plate configured to transfer torque between motor assembly 105 and hub 117. Motor torque coupler 116B addresses the desire to torque connect motor assembly 105 to hub 117 while resolving a minimal amount of mast moment through the motor assembly 105. In the embodiment of FIG. 2, motor torque coupler 116B comprises a composite flexure plate, however other embodiments may comprise any suitable coupler, for example: a scissor link, other mechanical link, a link with a small compliant section, a constant velocity joint, or a universal-joint. Furthermore, the motor torque coupler 116B may comprise any material including composite, metal, resin, or any other suitable material.

Aircraft propulsion system 100 comprises bearing retainer 118. In the embodiment of FIG. 2 bearing retainer 118 comprises a threaded nut that threads onto shaft threads 119. The bearing retainer 118 may address a desire to preload the hub shaft bearings 114a and 114b. The embodiment of FIG. 2 also comprises preload spacer 120.

In the embodiment of FIG. 2, aircraft propulsion system 100 comprises hub 117. The hub may be rigidly connected to the hub shaft by attachment hardware 122. In the embodiment of FIG. 2, the hub shaft 113 is configured to react mast moment forces as well as force components along the Z-axis. However, hub shaft 113 would have a rotational degree of freedom relative to nacelle 101 but for the shaft's rigid attachment to hub 117 and motor torque coupler 116B.

Motor assembly 105 is connected to motor mount 112. Windings 107 may create a time varying electromagnetic field which exerts a force on magnets 109. The force upon magnets 109 is reacted by motor rotor housing 106—which rotates when the motor is commanded to rotate. Motor torque coupler 116 is connected to motor assembly 105. In the embodiment of FIG. 2, the motor torque coupler 116B to motor assembly 105 connection comprises motor torque coupler attachment hardware 122.

Torque applied to motor torque coupler 116B by motor assembly 105 is transferred to hub 117—to which the rotor blades may be connected. Motor torque may be transferred to rotor system 123 primarily by way of motor torque coupler 116B. The mast moment may be reacted primarily by hub shaft 113.

In one embodiment, the desired degrees of freedom are accommodated (or constrained as desired) by disposing a motor torque coupler 116B that has a stiffness of approximately 100 ft-lb/deg. in the mast moment bending direction and 25,000 ft-lb/deg. in motor-shaft torsion. The ratio of torsion stiffness to mast moment stiffness in that embodiment is 250:1. Any other suitable stiffnesses and ratio of stiffnesses may be used. For example, a stiffness ratio of at least 200:1 may address a desire for certain characteristics. In other embodiments, a ratio of at least 100:1 may address a desired characteristic. In some embodiments the motor torque coupling comprises a linkage—such embodiments may provide minimal amount of reaction force to mast moment bending loads while providing a desired stiffness in torsion.

In the embodiment of FIG. 2, nacelle webbing 104 comprises a foam core 126. In other embodiments, the nacelle webbing may comprise a radial pie slice composite webbing, core stiffened web, or any other interposing structure for connecting the inner and outer nacelle structural members together.

Figure 3A:
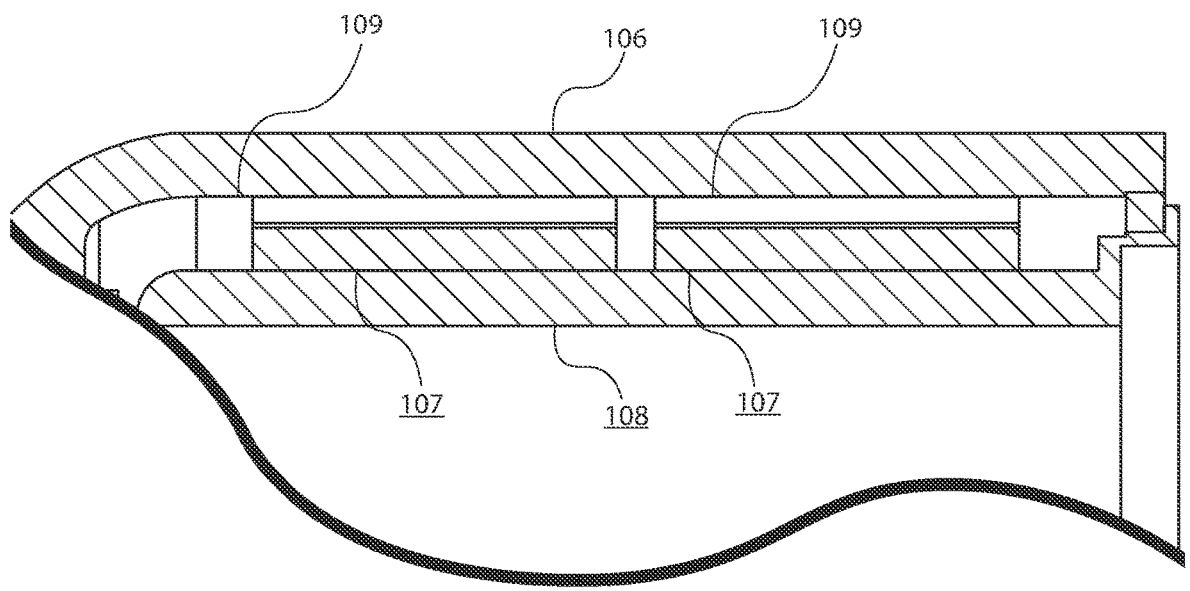
FIG. 3A shows a detail view of aspects of a motor assembly.
Figure 3B:
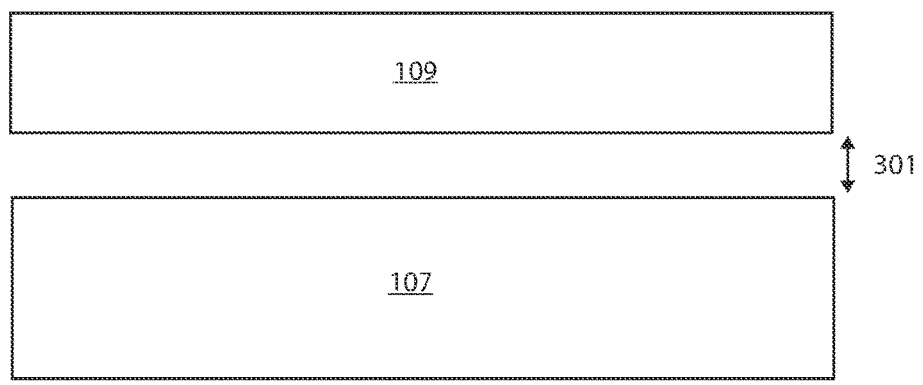
FIG. 3B is a simplified illustration of aspects of a motor assembly.

In one aspect, described herein is an electric aircraft propulsion system that addresses a desire to maintain a consistent motor air gap. Shown in FIGS. 3A and 3B are aspects of the motor assembly 105 of the same embodiment as FIG. 2. Aspects of the aircraft propulsion system may be configured to achieve a windings-to-magnet distance 301. The distance may vary over time during different modes of operation. Furthermore, the windings-to-magnet distance 301 may vary at different regions of the motor assembly 105. For example, if a force contorts motor rotor housing 106, the windings-to-magnet distance 301 may be greater in a first region of the motor assembly relative to the windings-to-magnet distance 301 in a second region of the motor assembly. The difference may be cause by material deformation or by movement of components relative to each other.

Windings-to-magnet distance 301 is a significant factor in the achievable power density of a motor. For example, a first motor with a first windings-to-magnet distance 301 will have a higher power output for the same given weight of motor compared to a second motor—all other aspects being equal—if the first motor comprises a smaller windings-to-magnet distance 301.

However, windings-to-magnet distance 301 may be desirable to address mechanical interference issues. Motor windings 107 rubbing against motor magnets 109 can be catastrophic. Some embodiments may comprise windings-to-magnet distance (radially) of between 0.015 to 0.030", 040" (1.016 mm) to 0.050" (1.27 mm); 0.050" (25.4 mm) to 0.060" (1.524 mm); 0.060" (1.524 mm) to 0.070" (1.778 mm); 0.070" (1.778 mm) to 0.080" (2.032 mm); 0.080" (2.032 mm) to 0.100" (2.54 mm); or any other suitable windings to magnet distance. Such distances may address a desire to achieve high power to weight but also avoid mechanical interference. A range may be selected from the above listed ranges to address application specific desired air-gap characteristics as a function of increasing applied mast-moments.

In conventional aircraft direct-drive propulsion systems, whereby the large diameter motor bearings also resolve a non-negligible mast moment, a larger mechanical airgap may be desirable to address concerns with mast moment induced strain and misalignment causing mechanical interference, or a significant structural mass must be built into the assembly to arrest the geometrically disadvantaged geometry.

In one aspect, subject matter herein describes an aircraft propulsion system that addresses undesirable changes in windings-to-magnet distance contributed to by non-negligible mast moment forces. In some embodiments, having a hub shaft 113 separate from the primary motor torque load path may reduce the magnitude of mast moment force reacted by motor assembly 105—thus stabilizing the windings-to-magnet distance. Stabilizing windings-to-magnet distance can address a desire to maximize motor power density.

FIG. 4 illustrates a detailed section view of the same embodiment of a direct drive propulsion system as shown in FIG. 2. Shown in FIG. 4 are hub bearing inserts 115a and 115 as well as hub shaft 113.

Figure 5A:
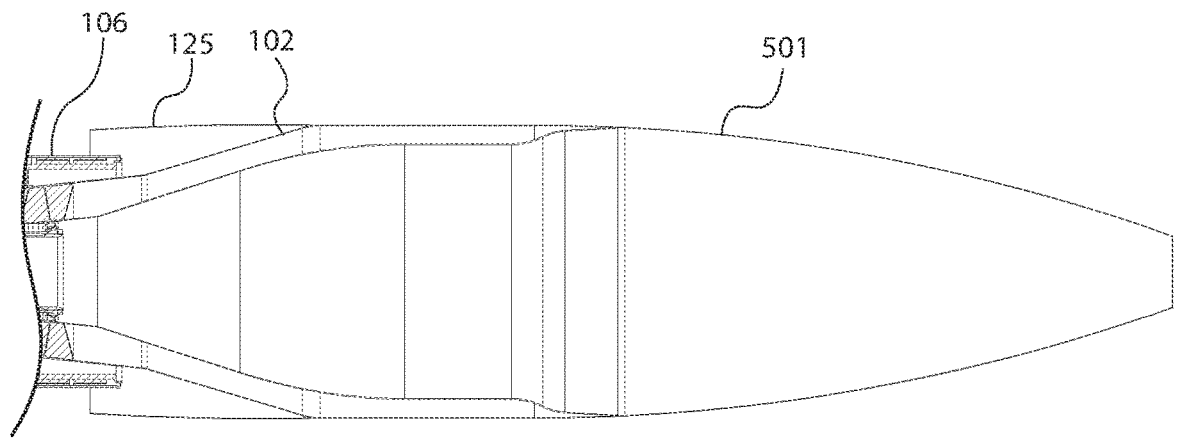
FIG. 5A illustrates a cutaway view of an embodiment of an aircraft propulsion system comprising a nacelle.
Figure 5B:
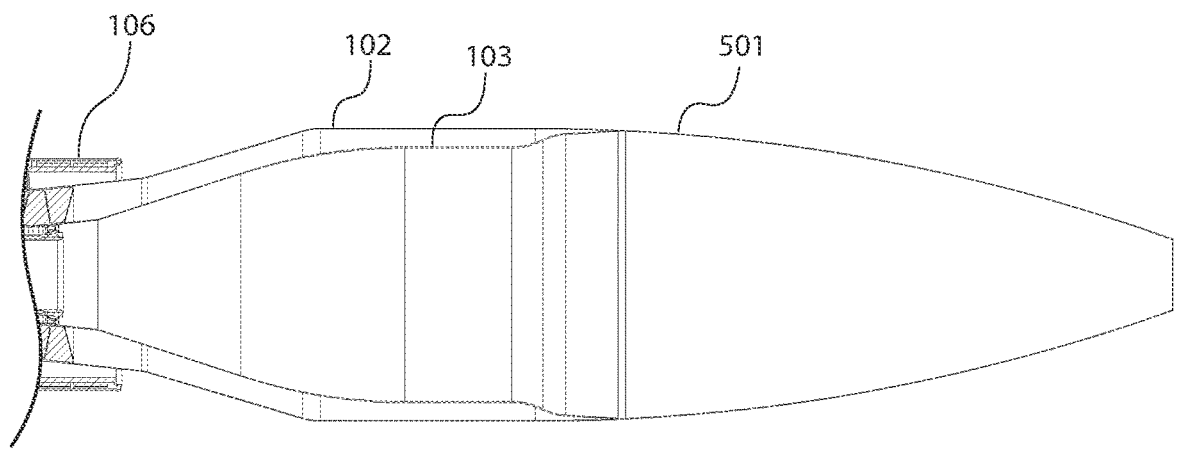
FIG. 5B illustrates a cutaway view of a different embodiment than the embodiment of FIG. 5A—of an aircraft propulsion system—comprising an alternative nacelle.

FIGS. 5A and 5B illustrate different embodiments of nacelle 101. The embodiment of FIG. 5A comprises fairing 125. The embodiment in FIG. 5B illustrates an embodiment without a fairing 125. An extra-long spinner may be used in conjunction with the embodiment of FIG. 5B to address a desire for a streamlined outer nacelle spinner and nacelle profile.

Shown in FIGS. 5A and 5B are embodiments comprising an inner nacelle structural member 103 and outer nacelle structural member 102 which are separate layers—with a gap between—towards the front of the nacelle. The inner and outer nacelle structural layers are connected to form a unified structural member 501 a distance back from the front of the nacelle.

Figure 6:
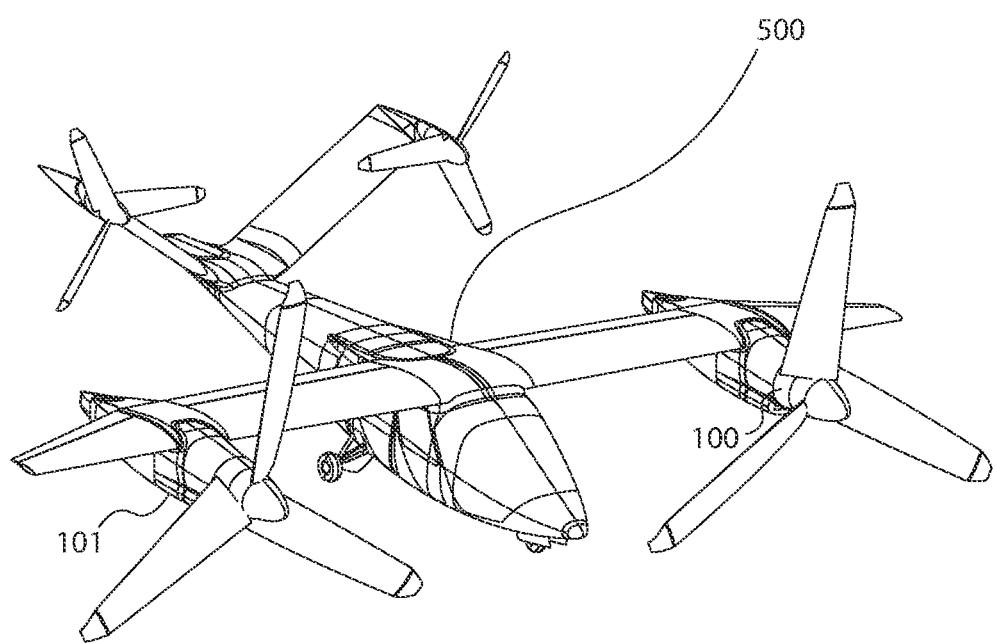
FIG. 6 illustrates an aircraft that comprises a propulsion system consistent with some principles described herein.

Some embodiments herein comprise a nacelle with a predominantly uninterrupted profile. However, other embodiments may comprise nacelles wherein a first portion of the nacelle tilts relative to a second portion of the nacelle. For example, the forward nacelles 101—illustrated in FIG. 6—may benefit from principles described herein. FIG. 6 illustrates tiltrotor aircraft 500 comprising an embodiment of an aircraft propulsion system 100.

Embodiments of the electric propulsion system described herein can be configured to be compact in length, mechanically simple, and eliminate the need for complicated shafting or similar kinetic power transmission. Such characteristics make embodiments of an electric propulsion system attractive choices for electric tiltrotor propulsion systems because the tilting of the propulsion system is simplified. Furthermore, the hub moment reaction characteristics can be favorable for tiltrotor aircraft that could sustain large or complex hub moment forces.

Furthermore, principles described herein are contemplated to be applied to other applications than aircraft with nacelles. For example, an embodiment may be configured for implementation in a direct drive helicopter. In such an example the inner and outer nacelle structural members may correspond to a first and second structural layer—for example, a first and second layer of a helicopter fuselage.

Figure 7:
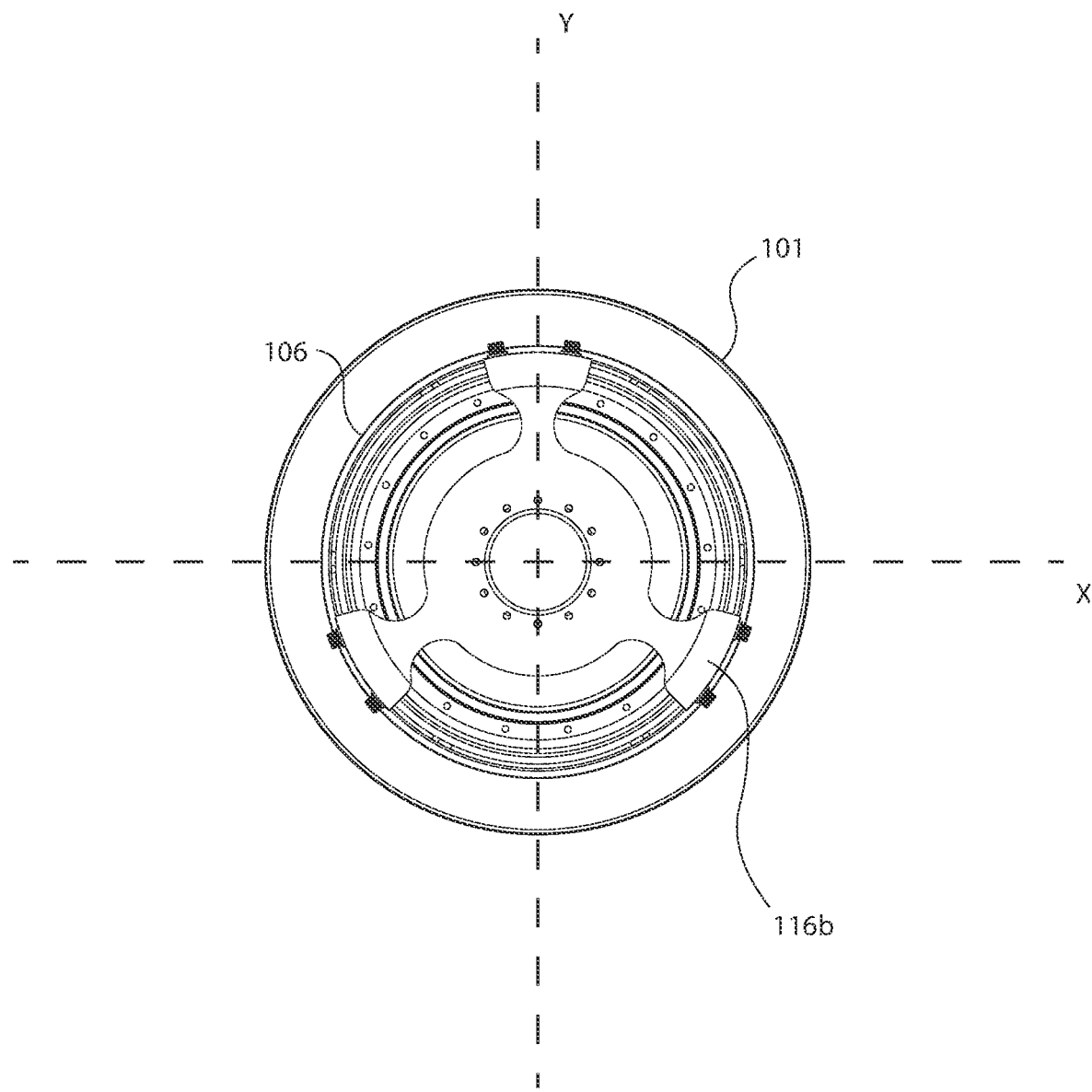
FIG. 7 illustrates a front view of aspects of an embodiment of an aircraft propulsion system.

FIG. 7 illustrates a front view of aspects of the embodiment of FIG. 1; an embodiment of a motor torque coupler 116B is shown as well as nacelle 101 and motor rotor housing 106.

Figure 8:
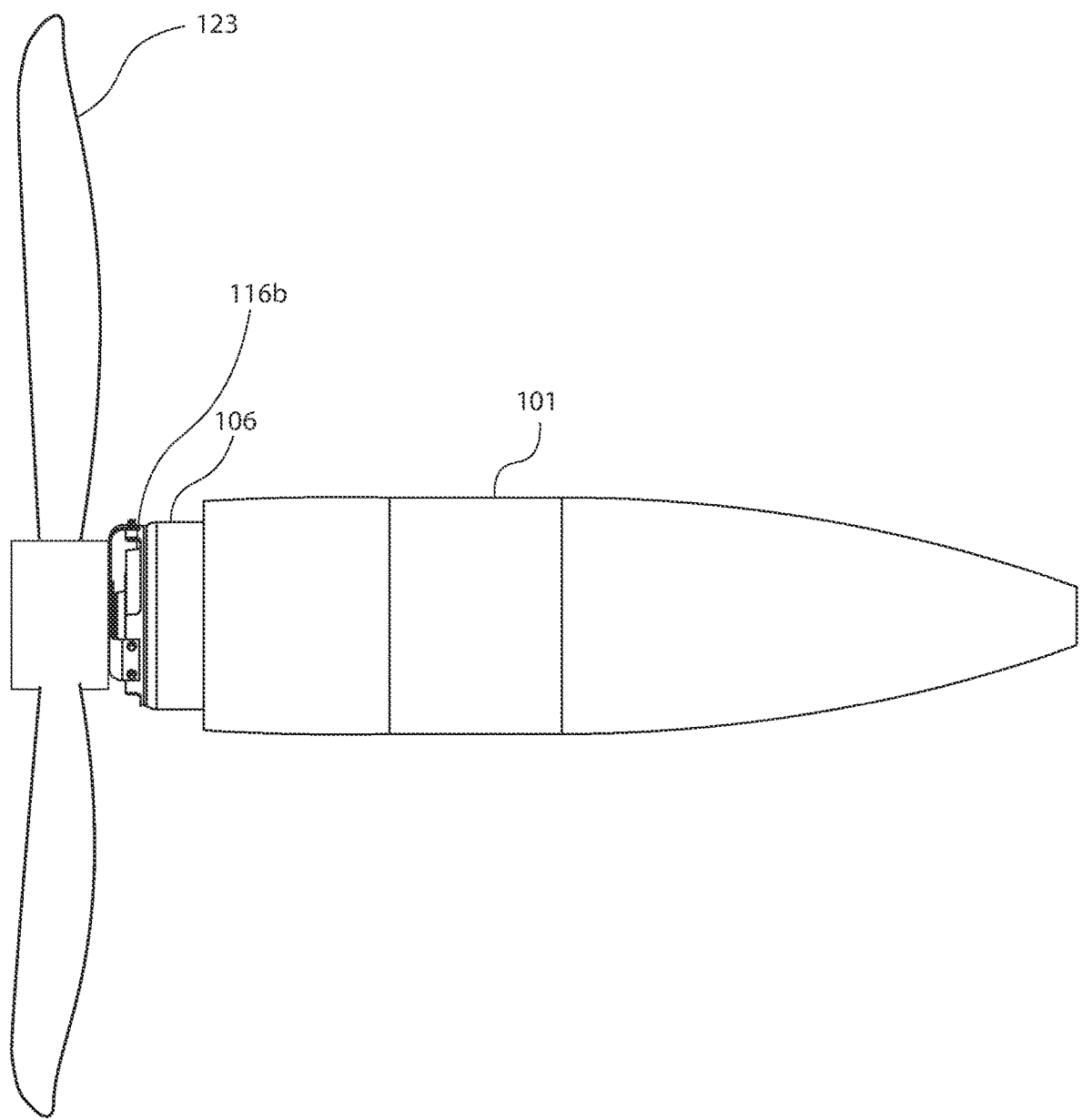
FIG. 8 illustrates an embodiment of an aircraft propulsion system; a rotor blade is shown.

FIG. 8 illustrates an embodiment of an aircraft propulsion system shown with rotor system 123. Also shown are motor torque coupler 116B and motor rotor housing 106.

Figure 9:
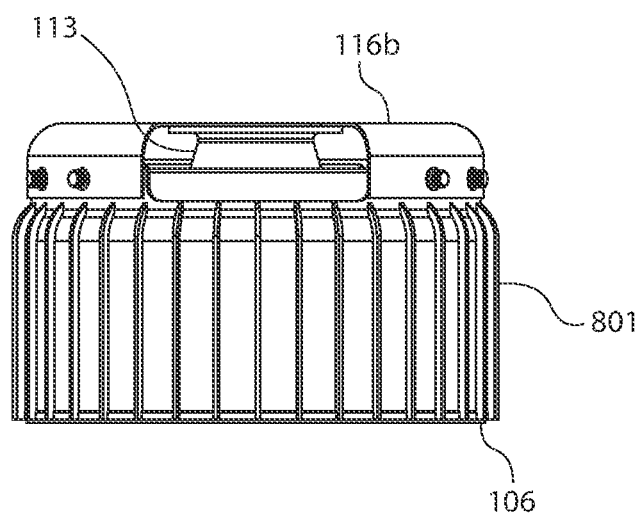
FIG. 9 illustrates aspects of an embodiment of an aircraft propulsion system including cooling fins.

FIG. 9 illustrates aspects of an embodiment of an aircraft propulsion system comprising cooling fins 801 which may be of any suitable type of cooling fins to address a desired cooling characteristic.

Figure 10:
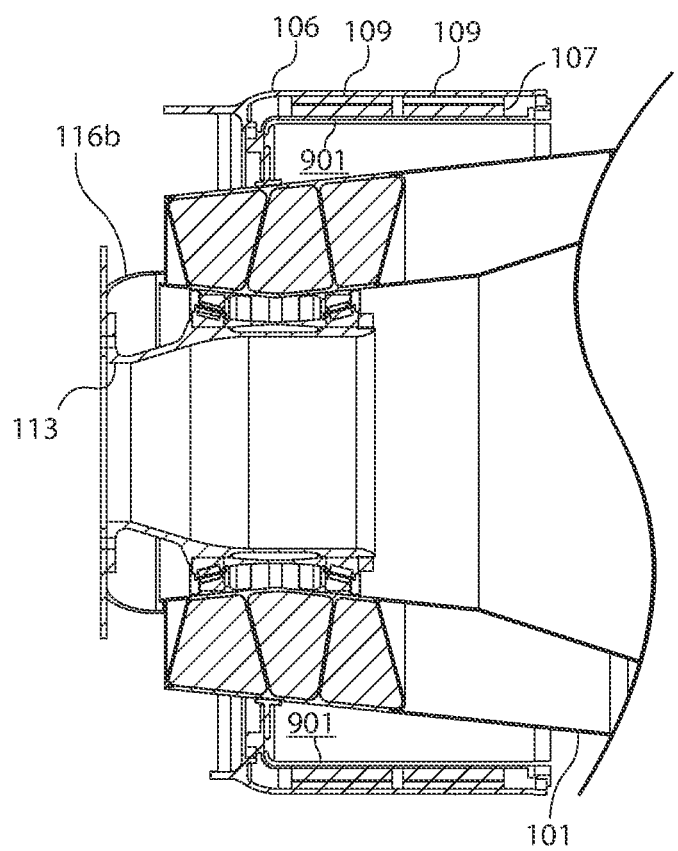
FIG. 10 illustrates a section view of an embodiment of an aircraft propulsion system comprising cooling fluid passages.

FIG. 10 illustrates aspects of an embodiment comprising cooling fluid passages 901. Cooling fluid passages may be in thermal communication with motor windings 107. Cooling fluid passages 901 may comprise active or passive cooling provisions. Cooling fluid passages 901 may be of any suitable configuration to address a desired cooling requirement.

Figure 11:
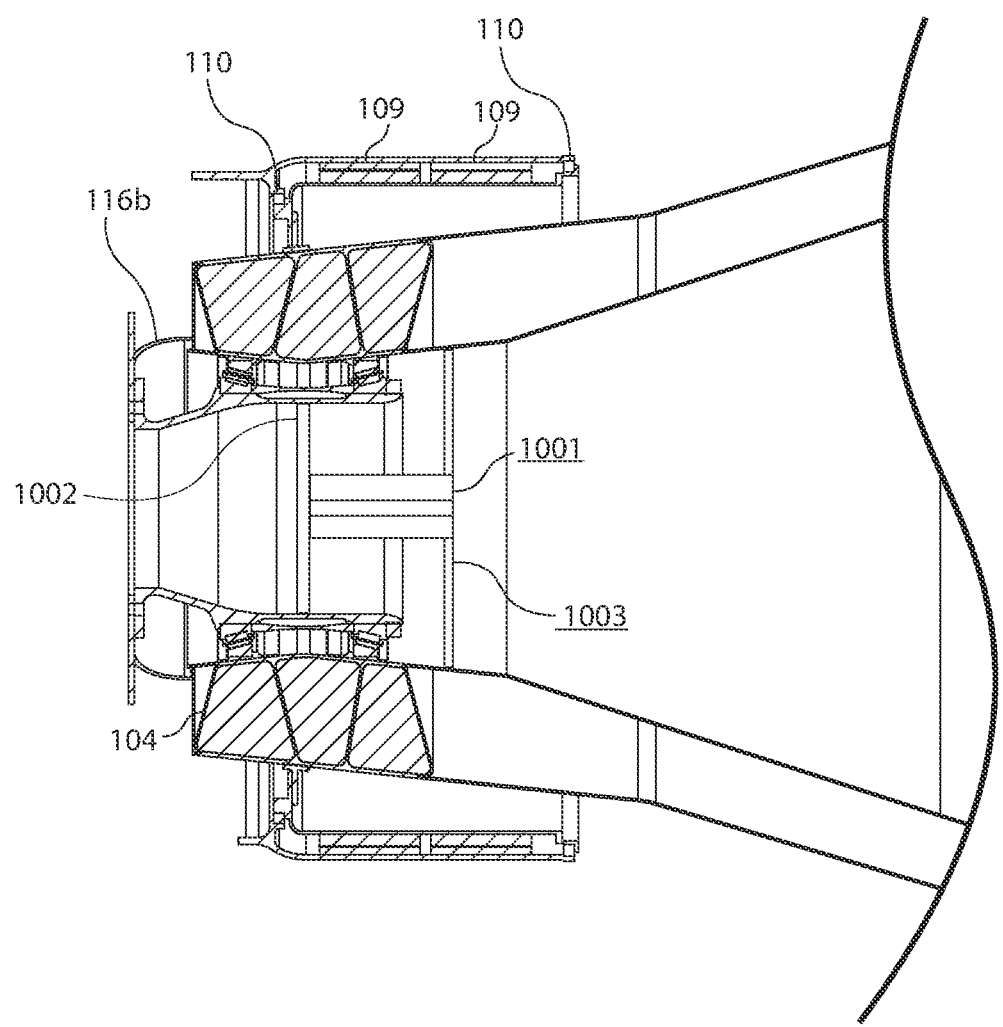
FIG. 11 illustrates a section view of an embodiment of an aircraft propulsion system comprising a slip ring.

Shown in FIG. 11 is an embodiment of an aircraft propulsion system comprising a slip ring 1001, front slip ring mount 1002, and rear slip ring mount 1003. The embodiment of FIG. 11 comprises a hollow core to allow additional wires to be passed through the slip ring 1001. A slip ring and/or a hollow core may address a desire to connect provisions to aspects of the rotor system. For example, wires and fluid lines may be connected to individual blade control actuators on the rotating hub. Other examples may include connecting wires to sensors, transponders, transceivers, electronics, or other aspects mounted on the rotating hub.

Figure 12:
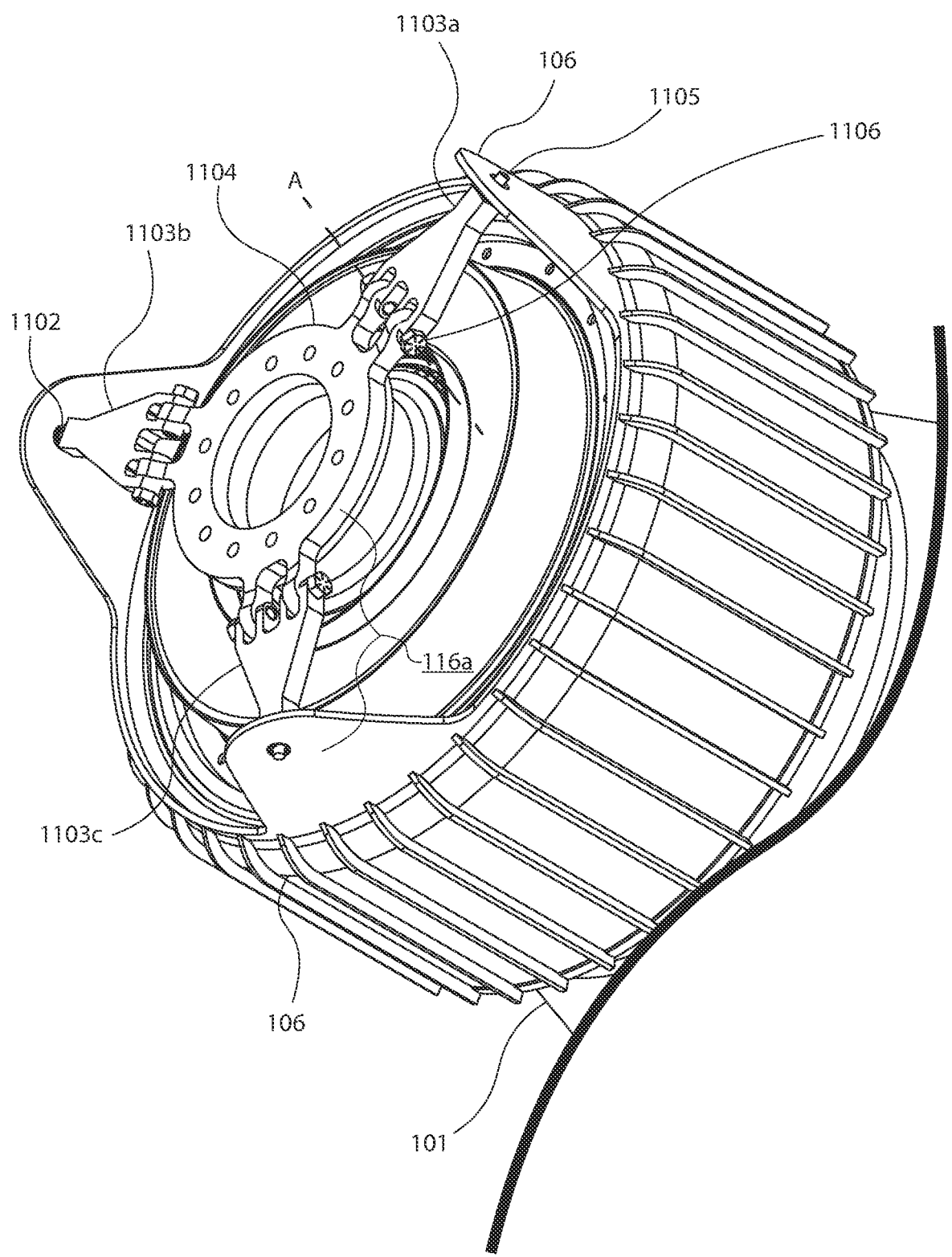
FIG. 12 illustrates aspects of an embodiment of an aircraft propulsion system comprising a motor torque coupler comprising an articulated linkage.

FIG. 12 illustrates aspects of an embodiment comprising a motor torque coupler comprising an articulated linkage system 116A. Articulated linkage system 116A comprises spherical bearings 1102; linkage arms 1103 and linkage arm attachment hub 1104. Linkage arm rod 1105 is disposed through spherical bearing 1102. Linkage arm 1103 is connected to linkage arm attachment hub 1104. The connection of linkage arm 1103 and linkage arm attachment hub 1104 comprises connection hardware 1106. The linkage arm attachment hub 1104 is attached to the hub shaft 113. The propulsion rotor hub (not shown in FIG. 11) is attached to the front of the linkage arm attachment hub. Linkage arms 1103 are prevented from rotating relative to linkage arm attachment hub 1104 about the rotor axis of rotation. Linkage arms 1103 are prevented from rotating relative to motor rotor housing 106 about the rotor axis of rotation. Linkage arm 1103 is connected to linkage arm attachment hub 1104 with rotational degree of freedom about an axis; shown in FIG. 11 is axis A, about which linkage arm 1103a has an axial degree of freedom. Linkage arm 1103 also has a degree of freedom to slide in and out of spherical bearings 1102. The motor torque coupler of the embodiment of FIG. 12 torque connects the proprotor system and the electric motor without resolving significant mast moment loads to the motor. If mast moment loads—substantial enough to cause significant hub shaft misalignment relative to the propulsion rotor axis of ration—are imparted to linkage arm attachment hub 1104 or the hub shaft 113, articulated linkage system 116A is configured to resolve no more than a negligible amount of the mast moment load to the motor.

Figure 13:
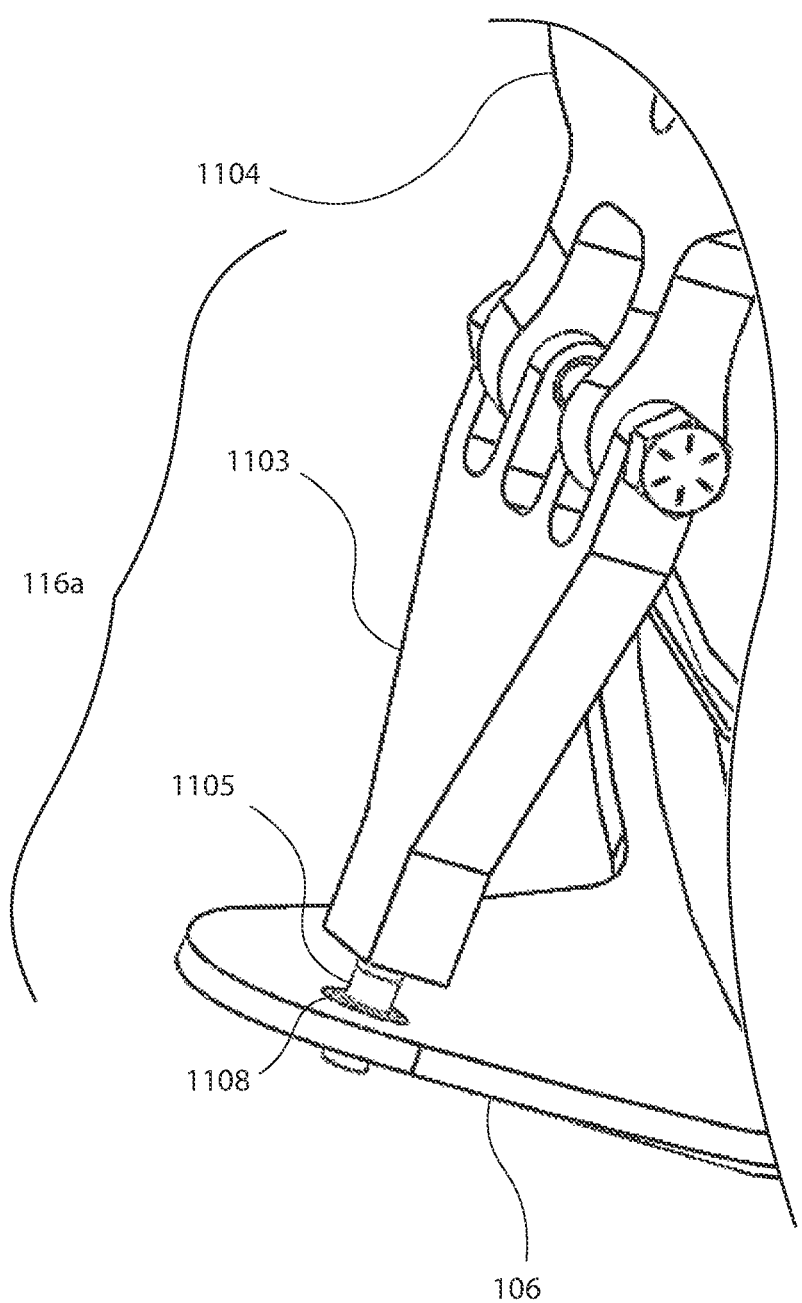
FIG. 13 illustrates aspects of one embodiment of a motor torque coupler including an articulated linkage.

FIG. 13 shows a detail view of articulated linkage system 116A. Linkage arm 1103 comprises linkage arm rod 1105. Linkage arm rod 1105 is connected to spherical bearing 1102 with a degree of freedom such that linkage arm rod 1105 may slide along spherical bearing 1102. Furthermore, the inner sphere 1108 of spherical bearing 1102 may rotate relative to motor rotor housing 106—to which the spherical bearing is attached. As such, linkage arm 1103 is configured to pivot about the center of spherical bearing 1102.

Figure 14:
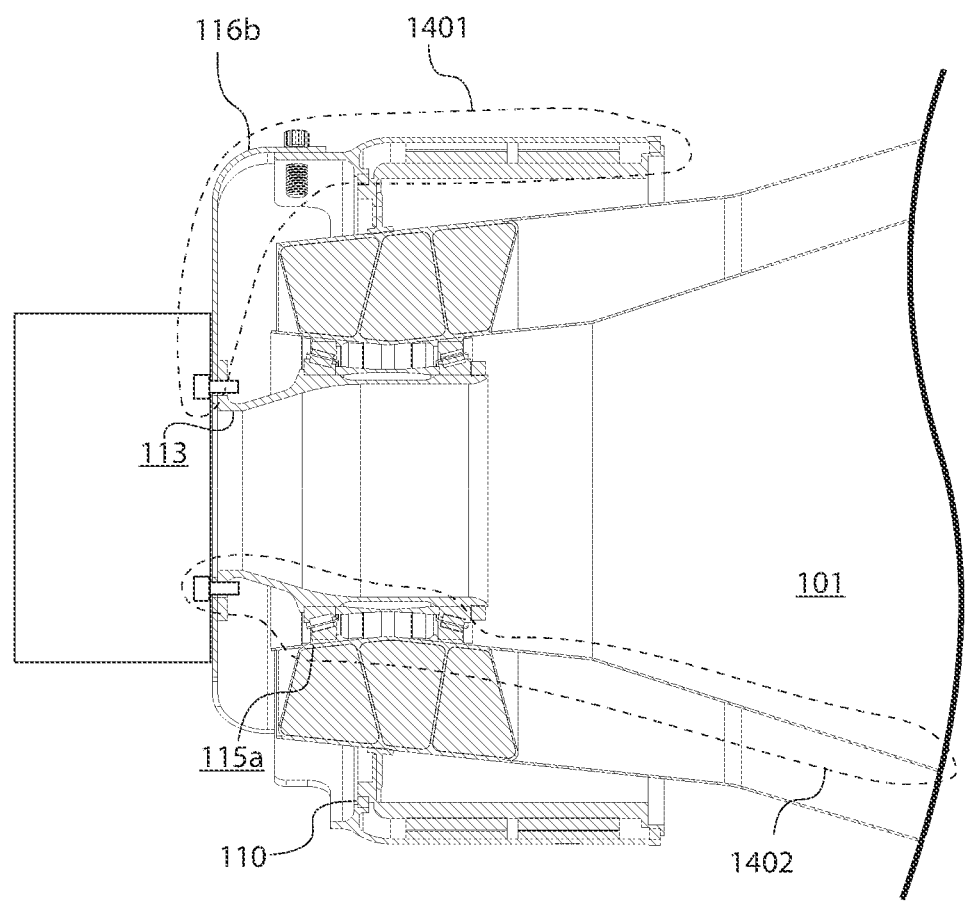
FIG. 14 illustrates the same embodiment of an aircraft propulsion system as shown in FIG. 2; load paths are illustrated.

FIG. 14 illustrates the same embodiment of an aircraft propulsion system as the embodiment of FIG. 2. A first load path 1402 and a second load path 1401 are shown. The first load path 1402 is configured to resolve most of the mast moment and thrust forces from the proprotor to the nacelle structure. The second load path 1401 is configured to transfer the motor drive torque from the motor 105 to the proprotor.

While specific examples are discussed herein, it should be understood concepts discussed herein may be applied to a broad range of applications such: as helicopter main and tail rotor systems, and/or pusher props, tilt-rotor propellers, fixed-wing aircraft propellers, watercraft, wind turbines, drilling rigs, or any other machine.

An embodiment of an aircraft propulsion system may comprise any suitable electric motor including: a DC motor, a permanent magnet brushless DC motor, an induction motor, a permanent magnet motor, a switched reluctance motor, an internal permanent magnet motor, or an exterior permanent magnetic motor, or any other suitable type of motor or torque source. Furthermore, some embodiments may comprise any number of motors or sets of windings and magnetic field sources. For example, the embodiment of FIG. 1 comprises two sets of windings and magnets. Any other number of winding and magnet sets may be used, for example 1, or 3, or 4, or 5. Furthermore, propulsion systems with multiple windings paired with a single magnetic field source—for example one set of magnets—may be used in other embodiments.

The invention claimed is:

1. An aircraft propulsion system comprising:
   a rotor hub;
   an electric motor; and
   a flexible motor torque coupler mechanically coupled between the hub and the electric motor, the motor torque coupler comprising a stiffness in a mast moment bending direction less than a stiffness in a motor shaft torsion direction.

2. The aircraft propulsion system of claim 1 additionally comprising a nacelle comprising an inner member, a webbing, and an outer member, wherein the webbing is located between the inner member and the outer member.

3. The aircraft propulsion system of claim 1 wherein the motor torque coupler comprises a composite material.

4. The aircraft propulsion system of claim 3 wherein the motor torque coupler comprises a composite flexure plate arranged such that that the motor torque coupler is rigid to torsional loads but compliant to mast moment loads.

5. The aircraft propulsion system of claim 1 wherein the motor torque coupler comprises an articulated linkage.

6. The aircraft propulsion system of claim 5 wherein the articulated linkage is metallic.

7. The aircraft propulsion system of claim 1 wherein the motor torque coupler comprises a flexure plate.

8. The aircraft propulsion system of claim 1 wherein the propulsion system comprises a slip ring.

9. The aircraft propulsion system of claim 1 further comprising a composite web configured to connect a first nacelle structural layer and a second nacelle structural layer.

10. The aircraft propulsion system of claim 1 additionally comprising a second motor.

11. The aircraft propulsion system of claim 1 additionally comprising a first and a second hub bearing wherein the first and second hub bearings are separated along an axis of rotation of the hub.

12. The aircraft propulsion system of claim 1 wherein the aircraft propulsion system is configured for a tiltrotor aircraft.

13. The aircraft propulsion system of claim 1 wherein a radial distance, from a hub center of rotation, of the torque coupler to the hub connection point is larger than a radial distance of the hub to nacelle connection point, from a hub center of rotation.

14. The aircraft propulsion system of claim 1 wherein an rpm of a motor rotor housing of the motor is equal to an rpm of a propulsion rotor.

15. The aircraft propulsion system of claim 1 wherein the torque coupler comprises a torsion stiffness to mast moment stiffness ratio of at least 200:1.

16. The aircraft propulsion system of claim 1 wherein the mast moment bending direction extends in a direction perpendicular to an axis of rotation of the rotor hub and the motor shaft torsion direction comprises a torsional force vector defined by the relative rotation between the rotor hub and the motor torque coupler.

17. The aircraft propulsion system of claim 2 wherein the webbing comprises a composite webbing.

18. An aircraft comprising:
a propulsion rotor hub;
a drive motor;
a flexible torque coupler mechanically coupled between the drive motor and the propulsion rotor hub; and
the motor torque coupler comprising a stiffness in a mast moment bending direction less than a stiffness in a motor shaft torsion direction.

* * * * *